(12) United States Patent
Christen et al.

(10) Patent No.: US 9,641,046 B2
(45) Date of Patent: May 2, 2017

(54) HAND-HELD MACHINE TOOL HAVING A DAMPING ELEMENT

(75) Inventors: Stefan Christen, Schneisingen (CH); Thomas Mathys, Lyss (CH)

(73) Assignee: Robert Bosch GmbH, Stuttgart (DE)

( * ) Notice: Subject to any disclaimer, the term of this patent is extended or adjusted under 35 U.S.C. 154(b) by 1053 days.

(21) Appl. No.: 13/878,778

(22) PCT Filed: Oct. 11, 2011

(86) PCT No.: PCT/EP2011/067698
§ 371 (c)(1),
(2), (4) Date: Aug. 7, 2013

(87) PCT Pub. No.: WO2012/049155
PCT Pub. Date: Apr. 19, 2012

(65) Prior Publication Data
US 2013/0307354 A1    Nov. 21, 2013

(30) Foreign Application Priority Data
Oct. 14, 2010    (DE) ........................ 10 2010 042 452

(51) Int. Cl.
*B24B 23/04*    (2006.01)
*H02K 5/24*    (2006.01)
*H02K 7/14*    (2006.01)
*B24B 41/00*    (2006.01)
*B25F 5/00*    (2006.01)

(52) U.S. Cl.
CPC ............ *H02K 7/145* (2013.01); *B24B 23/04* (2013.01); *B24B 41/007* (2013.01); *B25F 5/006* (2013.01); *H02K 5/24* (2013.01)

(58) Field of Classification Search
CPC . B25F 5/006; B25F 5/02; B25D 17/24; B25D 2250/121; B25D 2222/57; H02K 5/24; H02K 7/145; B23Q 11/0032
USPC ....... 173/162.1, 162.2; 310/50, 51; 248/560, 248/603, 672, 638
See application file for complete search history.

(56) References Cited

U.S. PATENT DOCUMENTS 4,905,772 A    3/1990 Honsa et al.
5,027,910 A *  7/1991 Honsa ..................... B25F 5/006
                                                        173/162.1

(Continued)

FOREIGN PATENT DOCUMENTS

CN    2100319 U    4/1992
CN    1115707 A    1/1996

(Continued)

OTHER PUBLICATIONS

International Search Report corresponding to PCT Application No. PCT/EP2011/067698, mailed Apr. 5, 2012 (German and English language document) (5 pages).

*Primary Examiner* — Michelle Lopez
(74) *Attorney, Agent, or Firm* — Maginot, Moore & Beck LLP

(57) ABSTRACT

A hand-held machine tool comprises a driving motor that is mounted in a machine tool housing and is used to drive a tool, and a damping element accommodated in the machine tool housing. At least one damping element is arranged between the housing of the driving motor and the machine tool housing and forms a support element for mounting and supporting the driving motor in the machine tool housing.

21 Claims, 6 Drawing Sheets

(56) References Cited

U.S. PATENT DOCUMENTS

| | | | | |
|---|---|---|---|---|
| 5,769,174 A * | 6/1998 | Lee | ............ | F16F 7/104 |
| | | | | 173/162.1 |
| 7,040,520 B2 * | 5/2006 | Turk | ............ | B25C 1/08 |
| | | | | 173/210 |
| 8,475,236 B2 * | 7/2013 | Zhang | ............ | B24B 23/02 |
| | | | | 173/162.2 |

FOREIGN PATENT DOCUMENTS

| | | |
|---|---|---|
| DE | 10 2005 061 870 A1 | 7/2007 |
| DE | 10 2006 034 078 A1 | 12/2007 |
| EP | 0 849 492 A2 | 6/1998 |
| RU | 2 162 783 C2 | 2/2001 |
| SU | 1696688 A1 | 12/1991 |
| WO | 94/19152 A1 | 9/1994 |

\* cited by examiner

HAND-HELD MACHINE TOOL HAVING A DAMPING ELEMENT

This application is a 35 U.S.C. §371 National Stage Application of PCT/EP2011/067698, filed on Oct. 11, 2011, which claims the benefit of priority to Serial No. DE 10 2010 042 452.8, filed on Oct. 14, 2010 in Germany, the disclosures of which are incorporated herein by reference in their entirety.

The disclosure relates to a hand-held power tool, in particular to a sanding appliance such as, for example, a random-orbit sander or an oscillating sander.

BACKGROUND

DE 10 2006 034 078 A1 describes a hand-held sanding power tool, which has a vibration decoupling device, by means of which the handle is decoupled, in respect of oscillations, from the casing that comprises the drive unit. The handle constitutes a separately realized casing part that is connected, by means of the vibration decoupling device, to the further casing part that receives the drive unit. The drive unit comprises an electric drive motor, and a transmission device for transmitting the drive motion to the sanding tool. When the hand-held power tool is in operation, oscillations and vibrations that propagate into the casing are produced when the workpiece is being machined, and in the drive, an effective damping of the oscillations and vibrations, and decoupling, being achieved in the handle by means of the vibration decoupling device.

The vibration decoupling device comprises flexurally elastic column elements, which are disposed between the handle and the casing part that receives the drive unit. The vibration decoupling device must be designed such that no direct contact occurs between the handle and the casing part that receives the drive unit, either as a result of material aging or when the power tool is subjected to high load.

SUMMARY

The disclosure is based on the object of ensuring, through simple measures, an effective vibration decoupling between the drive unit of a hand-held power tool and the handle.

The hand-held power tool according to the disclosure is used for machining a workpiece by removal of material. The hand-held power tool is preferably a sanding appliance, in particular a random-orbit sander or an oscillating sander. In a machine casing the hand-held power tool has a drive unit, which comprises a drive motor and a transmission device for driving a tool. For the purpose of reducing oscillations, a damping element is disposed in the machine casing, in the transmission path between the drive unit and a casing part.

According to the disclosure, it is provided that the damping element is disposed directly between the motor casing of the drive motor and the machine casing, and at the same time constitutes a carrier element for holding and supporting the drive motor in the machine casing. The damping element thus assumes two functions, namely, on the one hand, the oscillation-reducing action and, on the other hand, a function of supporting the motor casing. In this way, the structural design of the machine casing is simplified, as there is no need for a specially configured casing part to receive the drive motor. Consequently, there are additional configuration possibilities with regard to the design of the hand-held power tool.

Furthermore, it is ensured that no direct contact occurs between the motor casing of the drive motor and the machine casing, even under high load. For this purpose, the drive motor is preferably held exclusively by means of the damping elements in the machine casing. This can be achieved, in a preferred embodiment, in that the damping element transmits forces in at least two differing directions and is thereby also instrumental in vibration decoupling in these directions.

According to an alternative embodiment, however, it can also be expedient to combine the damping elements with connecting elements, by means of which the motor casing is connected to the machine casing. In the case of this embodiment, the connecting and damping elements are preferably disposed in such a way that exclusively one connection acts, via the damping element, in at least one direction and, in a further direction, the additional connecting element is active, such that the vibration decoupling is effected at least in the direction in which the damping element is active.

An electric motor is preferably used as a drive motor. Accordingly, the motor casing is a pole casing, acting on which are one or more damping elements for the purpose of support in respect of the machine casing. In a further advantageous embodiment, a drive motor operated with compressed air can also be used.

According to an expedient further realization, it is provided that a plurality of damping elements, distributed over the circumference, are disposed between the motor casing and the machine casing. In this way, all-round support and effective oscillation decoupling between the motor casing and the machine casing are achieved.

According to a further advantageous embodiment, it is provided that at least one damping element is realized as a compact damping block. The damping block is realized, in particular, as a polygonal block, this having the advantage that there are flat surfaces for support in relation to the motor casing and/or machine casing. Owing to the compact embodiment of the damping element, the latter can also transmit large forces, and is thus also suitable for use under high load.

In principle, for the damping element, both flat and curved surfaces are possible, the damping element being in bearing contact with the motor casing and/or the machine casing via said surfaces.

In the case of a plurality of damping elements that support and hold the motor casing in relation to the machine casing, these elements are either realized as individual elements or are linked together, in particular held on a connecting carrier ring. The carrier ring can be laid around the motor casing, this resulting, in particular, in advantages in respect of assembly. The carrier ring may possibly be made of a damping material.

Furthermore, it can be expedient to use at least one damping element in a receiving device that is disposed in the motor casing and/or in the machine casing. The receiving device can be used both for individually realized damping elements and for damping elements that are connected to each other via a carrier ring. The receiving devices have, in particular, a base cross section that is matched to the damping elements and with laterally projecting walls, such that, on the one hand, the damping elements are securely received in the receiving devices and, on the other hand, it is possible for force to be transmitted not only in the radial direction in relation to the motor casing, but also in the direction of the longitudinal axis, or in the transverse direction. Furthermore, the laterally projecting elements can serve as an assembling aid.

In order to improve the mounting of the damping elements, it can be expedient to provide at least one of the damping elements with a recess, the receiving device comprising a centering pin on to which the damping element can be slid. The centering pin facilitates assembly and, moreover, enables an increased transmission of force in a plurality of directions, i.e. both radially in relation to the motor longitudinal axis and in the axial direction, or in the transverse direction.

Receiving devices and centering pins may possibly be combined, in particular in such a way that disposed within the receiving device there is a centering pin on to which the damping element, provided with a recess, can be slid.

The receiving devices and/or the centering pins are located either only on the motor casing or only on the machine casing, or on both casings.

Since the vibration decoupling is effected between the motor casing and the machine casing, the machine casing can be realized as a single piece that includes the handle. It is not necessary for the handle to be realized separately and to be connected, in respect of the central casing of the hand-held power tool, by means of oscillation decoupling components.

BRIEF DESCRIPTION OF THE DRAWINGS

Further advantages and expedient embodiments are given by the further claims, the description of the figures and the drawings, wherein:

DETAILED DESCRIPTION

In the figures, components that are the same are denoted by the same references.

Figure 1:
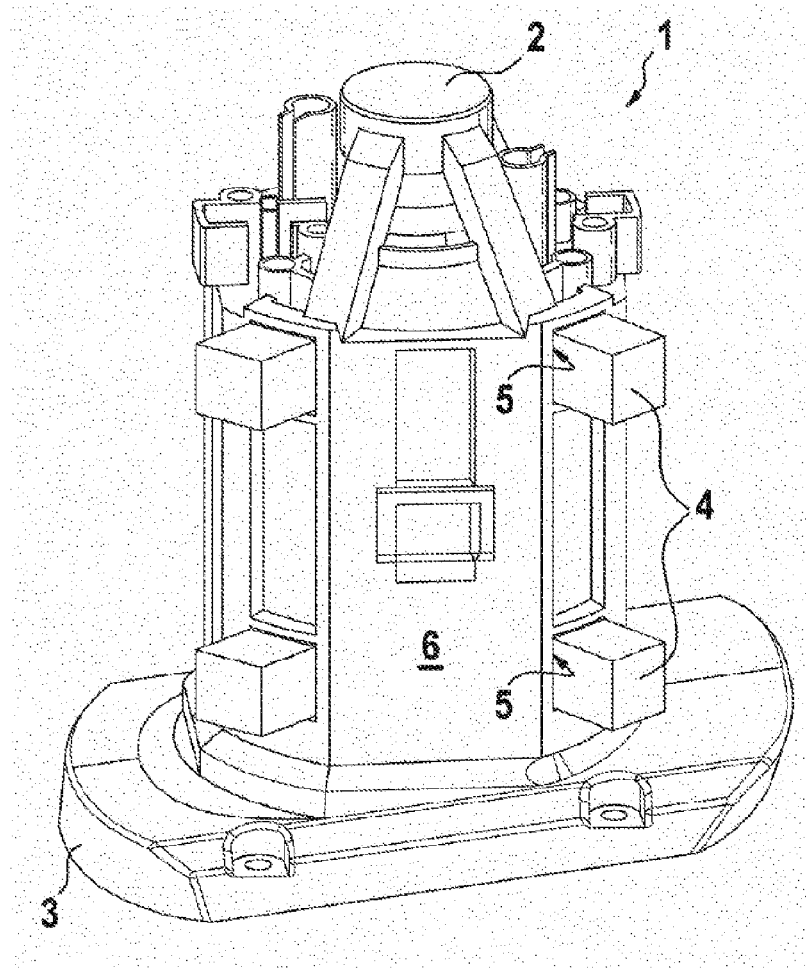
FIG. 1 shows a drive motor as a constituent part of a hand-held sanding power tool, a plurality of damping elements, realized as blocks, being disposed on the pole casing of the motor, which damping elements are distributed over the circumference and in the axial direction, for the purpose of support in respect of a machine casing.

Represented in FIG. 1 is an electrical drive motor 1, which is used to drive a tool, for example in a hand-held sanding power tool. The electric drive motor 1 has a motor casing, or pole casing 2, which is connected in the base region to a flange geometry 3 that encompasses the sanding tool. Via the flange geometry 3, the motor casing 2 is connected to a covering hood, or suction extraction hood, which is realized as a separate component. The flange geometry 3 assumes additional functions for the extraction of dust by suction.

Figure 2:
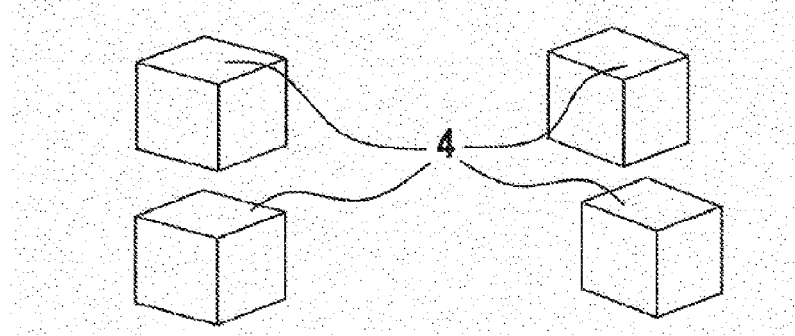
FIG. 2 shows the damping elements, realized as blocks, in a perspective, discrete view.

Let into the circumferential surface 6 of the pole casing 2 are receiving devices 5, which serve to receive damping elements 4, by means of which the pole casing 2 is supported in respect of a machine casing of the hand-held sanding power tool. Expediently, the mechanical coupling between the pole casing 2 and the machine casing is effected exclusively by means of the damping elements 4 on the circumferential surface 6 of the pole casing 2. The receiving devices 5 are realized as cavities in the pole casing 2, into which the cuboid damping elements 4 (FIG. 2) can be inserted. The cross section of the cavities is matched to the cross section of the damping elements 4, which constitute cuboid blocks made of a rubber-elastic material, for example a PUR elastomer, such as Cellasto. Owing to the recessed realization of the receiving devices 5 in the pole casing 2, the cuboid damping elements 4 are received in a form-fitting manner, both in the direction of the longitudinal axis of the drive motor and in the transverse direction. Furthermore, the damping elements 4 are held securely, in the receiving devices 5, on to the drive motor 1, in the radial direction.

In total, a plurality of individual cuboid damping elements 4, distributed over the circumference and in the axial direction, are disposed on the circumferential surface 6 of the pole casing 2. Expediently, at each axial end there are a plurality of damping elements 4, distributed over the circumference.

Figure 3:
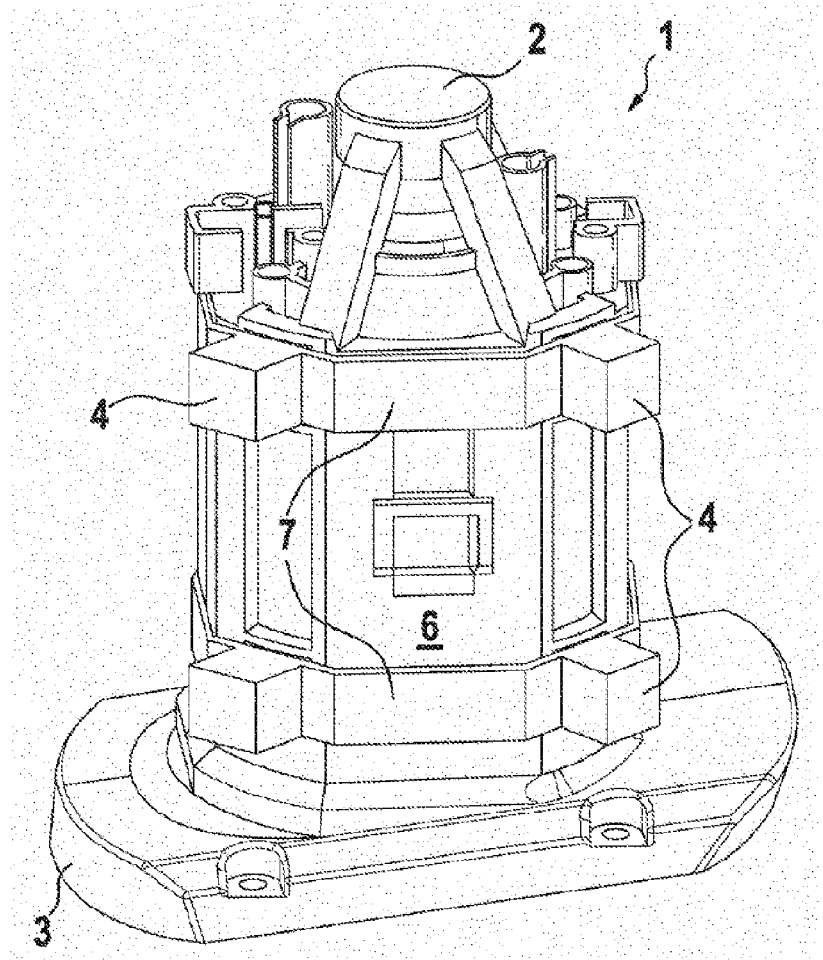
FIG. 3 shows a representation corresponding to FIG. 1, but with the damping elements on a connecting carrier ring.
Figure 4:
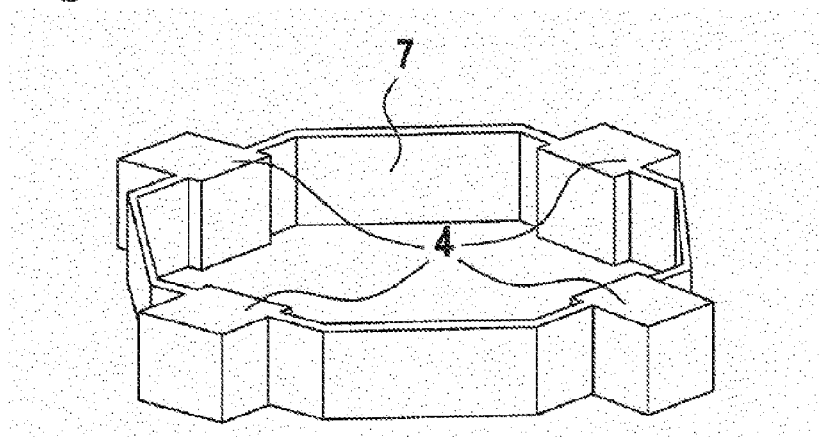
FIG. 4 shows the carrier ring with the damping elements, in a discrete representation.

In the exemplary embodiment according to FIGS. 3 and 4, the cuboid or block-shaped damping elements 4 are held on a carrier ring 7. The carrier ring 7, with the damping elements 4, is laid around the circumference of the pole casing 2. A plurality of damping elements 4 are held on the carrier ring 7, there being four damping elements 4 on the carrier ring 7 in the exemplary embodiment. Since the carrier ring 7 and damping element 4 are realized in a sleeve-type manner, it is possible to dispense with receiving devices 5 in the pole casing 2. The carrier ring 7 and the damping element 4 can be realized so as to constitute a single piece and, in this embodiment, are composed of the same material. In principle, however, it is also possible for them to be realized from differing materials, the damping elements 4 in this case being, for example, injection-molded on to the carrier ring 7.

Figure 5:
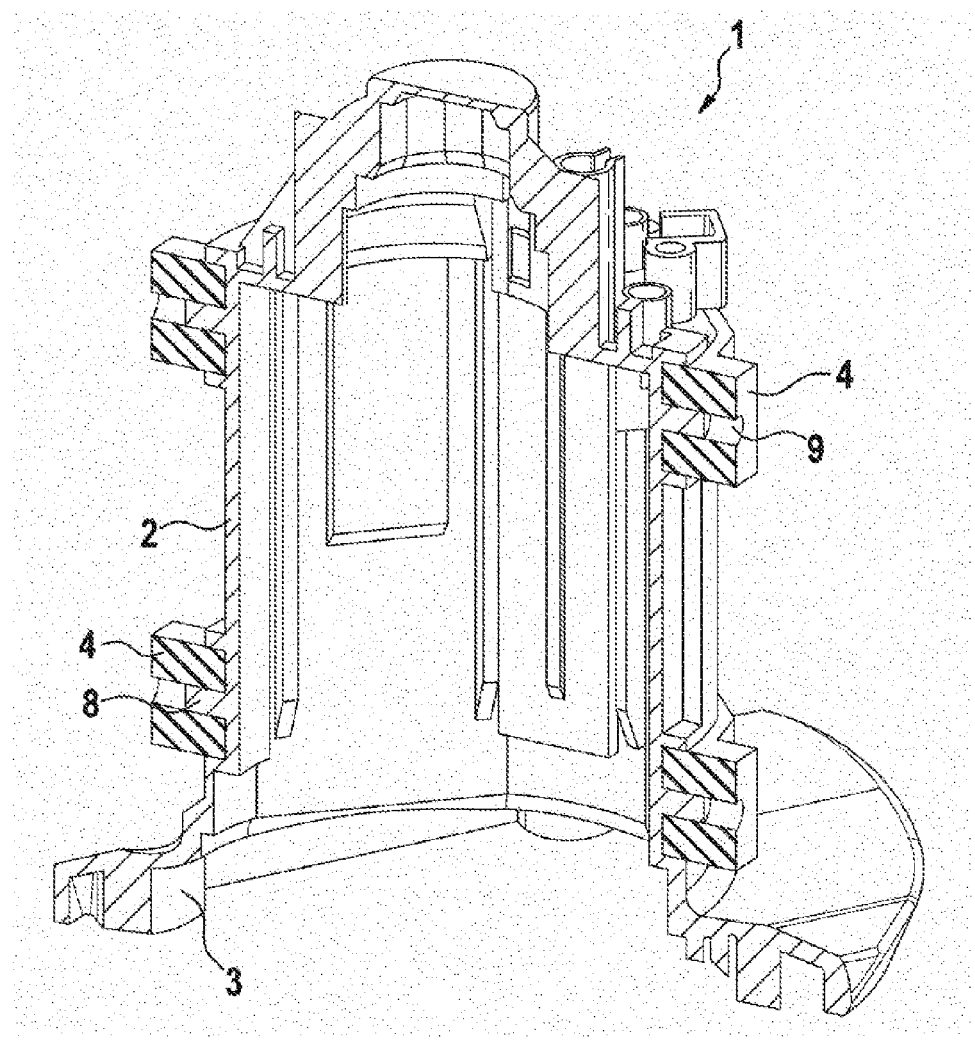
FIG. 5 shows a sectional representation of the motor casing, with damping elements disposed on the outside of the motor casing.
Figure 6:
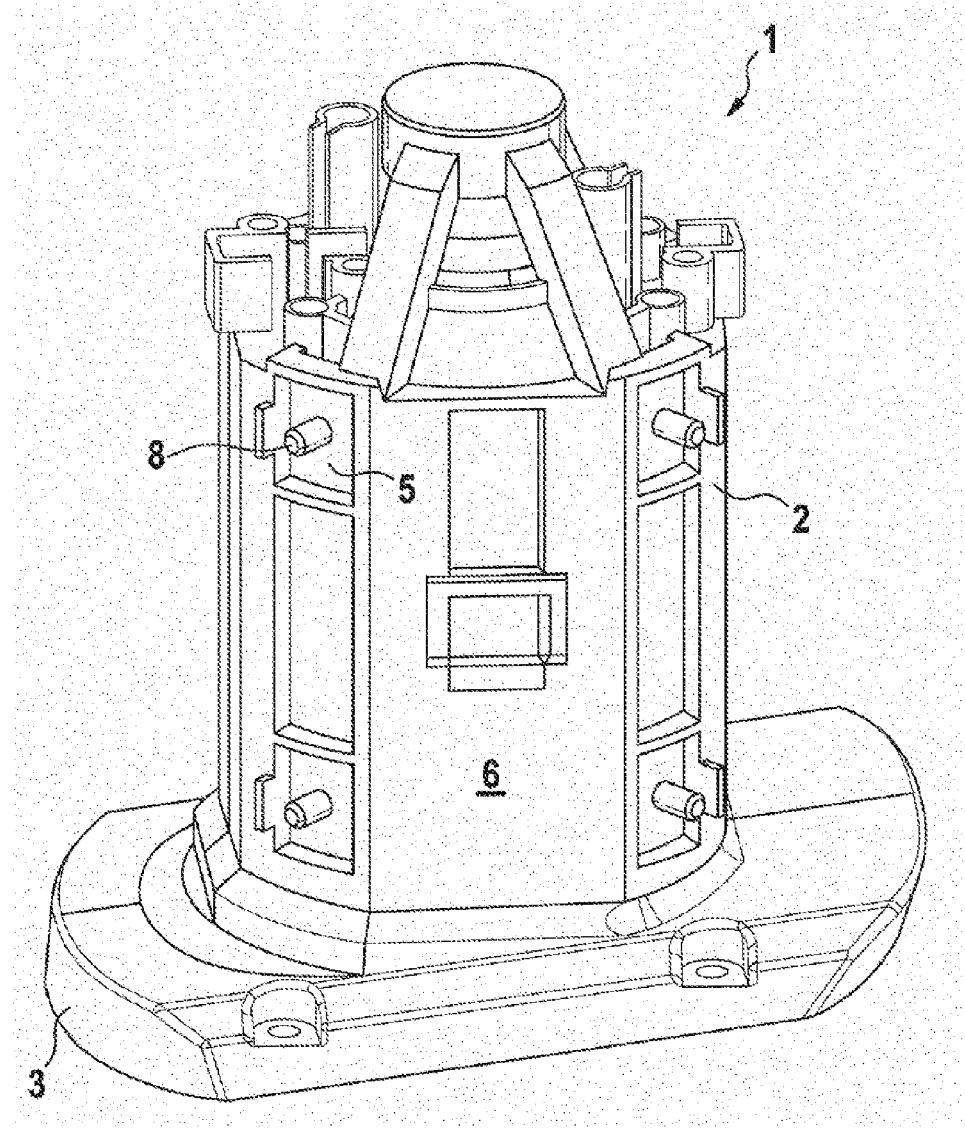
FIG. 6 shows the motor casing with receiving devices, inserted in which there is a radially projecting centering pin for fixing the damping elements.

In the exemplary embodiment according to FIGS. 5 and 6, let into the circumferential surface 6 of the pole casing 2 of the electrical drive motor 1 there are receiving devices 5, which serve to receive the block-shaped damping elements 4. In each receiving device 5 there is a centering pin 8, which is realized so as to constitute a single piece with the pole casing 2, and which projects radially.

Each damping element 4 has a central recess 9, by which the damping element is slid on to the centering pin 8. Thus, not only are the damping elements 4 received in a form-fitting manner inside the receiving devices 5 that are realized as a cavity in the circumferential surface 6 but, in addition, the damping elements 4 are secured by means of the centering pin 8.

Figure 7:
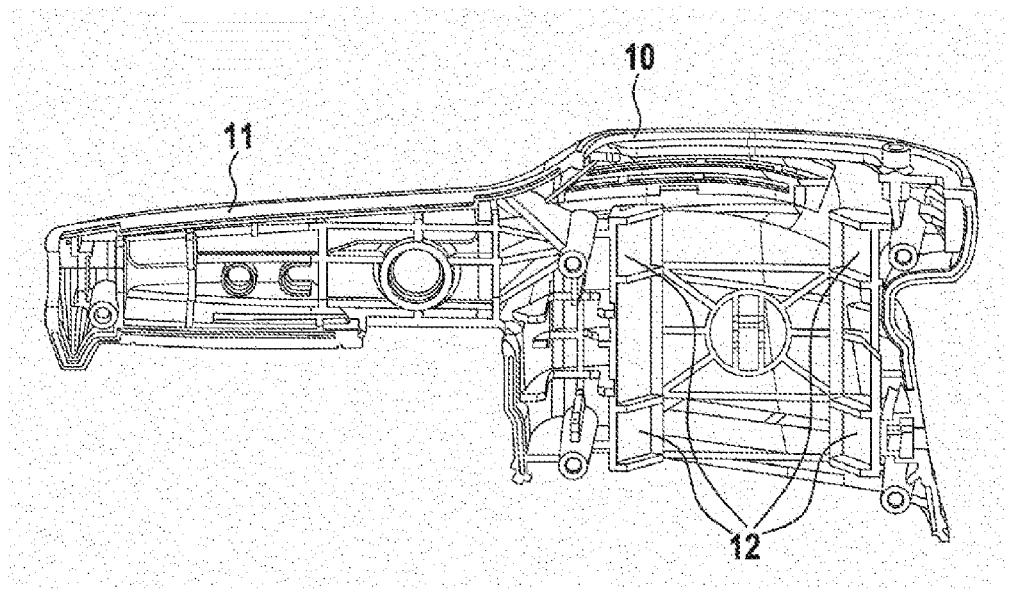
FIG. 7 shows the machine casing of the hand-held sanding power tool with receiving devices for receiving the damping elements.
Figure 8:
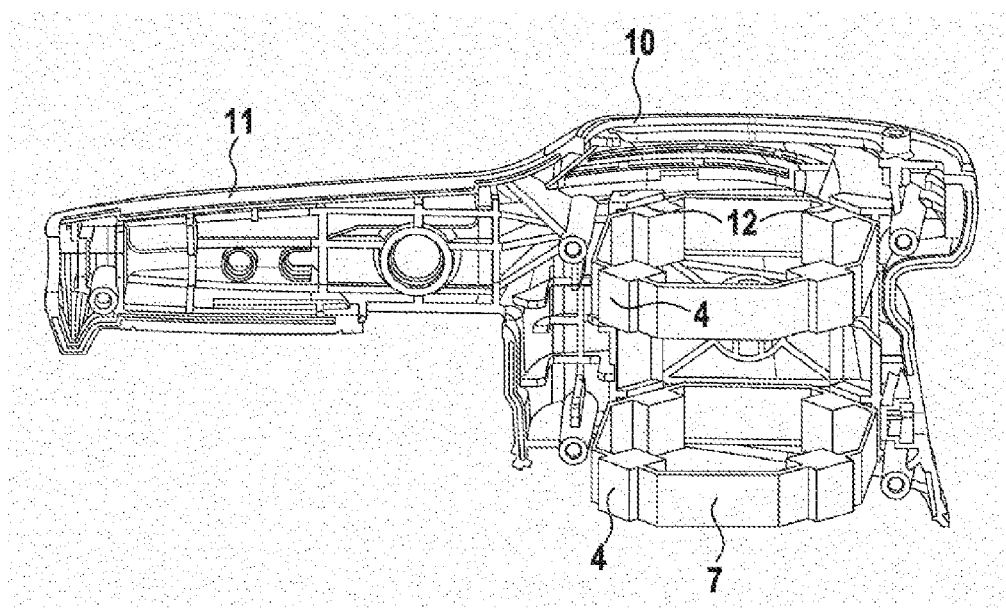
FIG. 8 shows a representation similar to that of FIG. 7, but with inserted damping elements, which are held on a circumferential carrier ring.

FIGS. 7 and 8 show the machine casing 10, into which the electrical drive motor is inserted. The handle 11, which is used to hold and guide the hand-held sanding power tool, is realized so as to constitute a single piece with the machine casing 10. On the inside of the machine casing 10 there are receiving devices 12 for receiving the damping elements 4. The receiving devices 12 are constructed in basically the same way as the receiving devices 5 on the circumferential surface of the pole casing. The receiving devices 12 are realized as cavities, and serve to secure the damping elements to the machine casing 10 in a form-fitting manner. Also possible, however, is the inverse realization, in which the decoupling elements have cavities and the casing has a convex geometry.

As can be seen from FIG. 8, the damping elements 4 are held on the carrier ring 7 and project, by their radially outer portion, into the cavities of the receiving devices 12 in the machine casing 10. The damping elements 4 project in a corresponding manner, by their radially inner portion, into the receiving devices 5 in the circumferential surface 6 of the pole casing, as represented, for example, in FIGS. 1 and 3.

FIGS. 7 and 8 show a casing half-shell of the machine casing. When in the fully assembled state, the machine casing is composed of two casing half-shells, which are joined together.

Figure 9:
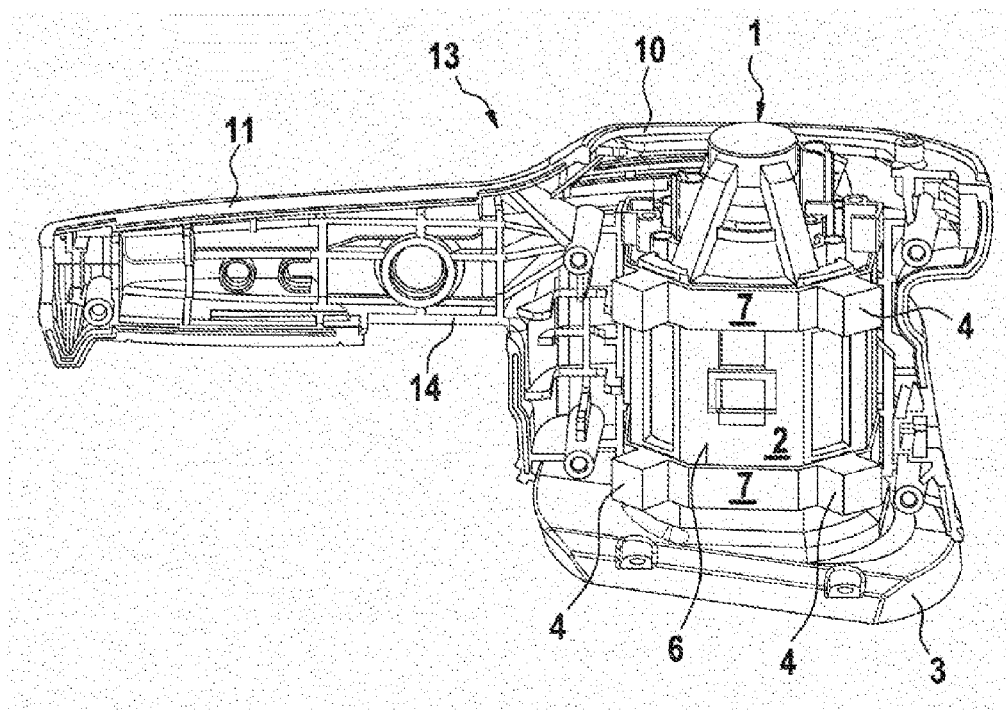
FIG. 9 shows the hand-held sanding power tool with an inserted drive motor, which is supported in respect of the machine casing, by means of the damping elements.
Figure 10:
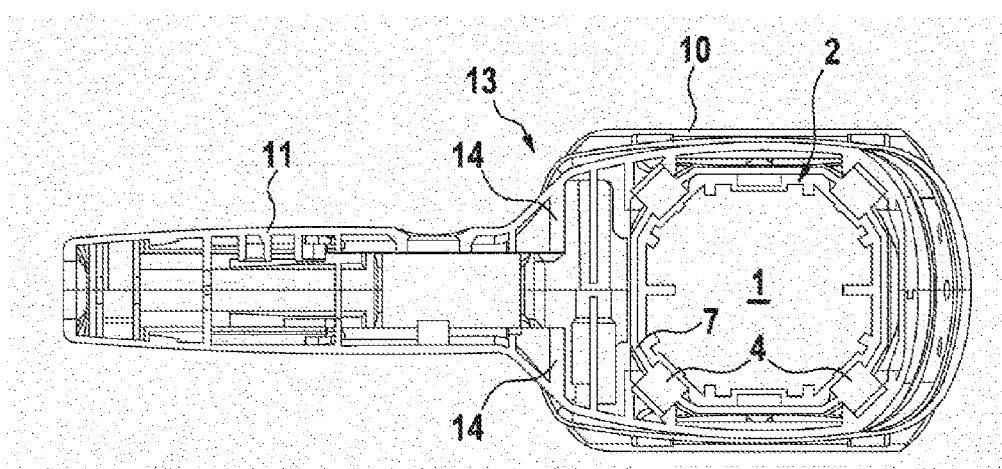
FIG. 10 shows the hand-held sanding power tool in a horizontal section.

FIGS. 9 and 10 show the hand-held sanding power tool 13 with a drive motor 1 integrated into the machine casing 10. FIG. 9 shows only one casing half-shell 14, whereas FIG. 10 shows both casing half-shells 14 combined to form the machine casing 10. As in the case of the previous exemplary embodiment, the damping elements 4 are held on the carrier ring 7 and laid around the circumferential surface 6 of the pole casing 2. The drive motor 1 is held exclusively by means of the damping elements 4 in the machine casing 10.

What is claimed is:

1. A hand-held power tool comprising:
a drive motor supported in a machine casing and configured to drive a tool; and
a plurality of damping elements positioned in the machine casing and configured to reduce oscillations,
wherein the damping elements are disposed between a motor casing of the drive motor and the machine casing and defines a carrier element configured to retain and support the drive motor in the machine casing,
wherein the damping elements are positioned around a circumference between the motor casing and the machine casing and spaced apart from each other about the circumference, and
wherein each damping element of the plurality of damping elements is held on a connecting carrier ring.

2. The hand-held power tool as claimed in claim 1, wherein the drive motor is held in the machine casing exclusively by the damping elements.

3. The hand-held power tool as claimed in claim 1, wherein the damping elements comprise compact damping blocks, and
wherein the damping blocks are polygonal blocks.

4. The hand-held power tool as claimed in claim 1, wherein the damping elements are positioned in a receiving device in at least one of the motor casing and the machine casing.

5. The hand-held power tool as claimed in claim 1, wherein the damping elements include a recess configured to enable the damping elements to slide onto a centering pin.

6. The hand-held power tool as claimed in claim 1, wherein the damping elements are configured to enable vibration decoupling in at least two differing directions.

7. The hand-held power tool as claimed in claim 1, wherein the damping elements include a rubber-elastic material.

8. A hand-held power tool comprising:
a machine casing
a drive motor retained in the machine casing, the drive motor including a motor casing and at least one damping element, the at least one damping element being configured to reduce oscillations of the drive motor,
wherein the at least one damping element is disposed between the motor casing of the drive motor and the machine casing and includes a carrier element configured to hold and support the drive motor in the machine casing,
wherein the machine casing has a centering pin, and
wherein the at least one damping element has a recess in which the pin is slidably received.

9. The hand-held power tool according to claim 8, wherein the at least one damping element has at least one cavity and the machine casing has a convex geometry.

10. The hand-held power tool according to claim 8, wherein the motor casing includes a receiving device, and
wherein the at least one damping element is received in the receiving device.

11. The hand-held power tool according to claim 10, wherein the receiving device has a base cross section that is matched to the damping element and laterally projecting walls.

12. The hand-held power tool according to claim 10, wherein the receiving device comprises a cavity into which the at least one damping element is inserted, and
wherein a cross section of the cavity is matched to a cross section of the at least one damping element.

13. The hand-held power tool according to claim 10, wherein the receiving device receives the at least one damping element in a form-fitting manner both in a direction of a longitudinal axis of the drive motor and in a direction transverse to the longitudinal axis.

14. The hand-held power tool according to claim 8, wherein the drive motor is retained within the machine casing exclusively by the damping elements.

15. The hand-held power tool according to claim 8, wherein the at least one damping element has flat or curved surfaces, via which the at least one damping element contacts the motor casing and/or machine casing.

16. The hand-held power tool according to claim 15, wherein the at least one damping element includes the curved surfaces, and
wherein the curved surfaces are in bearing contact with the motor casing and the machine casing.

17. The hand-held power tool according to claim 8, wherein the at least one damping element is realized as a compact damping block.

18. The hand-held power tool according to claim 8, wherein the at least one damping element is configured to transmit forces in a radial direction and in at least one of a direction of the longitudinal axis and a direction transverse to the longitudinal axis.

19. The hand-held power tool according to claim 8, wherein the at least one damping element is composed of a rubber-elastic material.

20. The hand-held power tool according to claim 8, wherein the machine casing is realized as a single piece that includes a handle, or, when in a fully assembled state, is formed from two casing half-shells which are joined together.

21. A hand-held power tool comprising:
a machine casing;
a drive motor retained in the machine casing, the drive motor including a motor casing and a plurality of damping elements, the plurality of damping elements being configured to reduce oscillations of the drive motor, wherein the plurality of damping elements are disposed between the motor casing of the drive motor and the machine casing, the plurality of damping elements being distributed about a circumference of the motor casing, wherein the plurality of damping elements constitute carrier elements which are configured to hold and support the drive motor in the machine casing, and wherein the plurality of damping elements are realized as compact damping blocks, the damping blocks being held on a connecting carrier ring.

* * * * *